United States Patent
Takao et al.

(10) Patent No.: US 7,298,507 B2
(45) Date of Patent: Nov. 20, 2007

(54) PRODUCT PRODUCTION SYSTEM, APPARATUS FOR MANAGING PRODUCTIONS, AND METHOD FOR PRODUCING DESIGNATED PRODUCTS

(75) Inventors: Toshiyuki Takao, Tokyo (JP); Koji Nakamura, Tokyo (JP); Shigeharu Hara, Tokyo (JP); Shinsuke Kato, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 962 days.

(21) Appl. No.: 09/769,382

(22) Filed: Jan. 26, 2001

(65) Prior Publication Data
US 2002/0015176 A1    Feb. 7, 2002

(30) Foreign Application Priority Data
Jan. 28, 2000    (JP) ............................ 2000-020579

(51) Int. Cl.
G06F 15/00 (2006.01)
G06K 1/00 (2006.01)
G06Q 99/00 (2006.01)

(52) U.S. Cl. ................. 358/1.15; 358/1.15; 705/67
(58) Field of Classification Search ............. 358/1.15, 358/1.1, 1.9, 1.11–1.18; 705/35, 38, 24, 705/67
See application file for complete search history.

(56) References Cited

U.S. PATENT DOCUMENTS

| | | | |
|---|---|---|---|
| 4,839,829 A | * | 6/1989 | Freedman .................. 715/751 |
| 5,598,279 A | * | 1/1997 | Ishii et al. .................. 358/402 |
| 5,732,400 A | * | 3/1998 | Mandler et al. ............. 705/26 |
| 5,864,825 A | * | 1/1999 | Kobayashi et al. .......... 705/24 |
| 5,970,478 A | * | 10/1999 | Walker et al. ............... 705/35 |
| 6,089,765 A | * | 7/2000 | Mori .......................... 400/61 |
| 6,658,393 B1 | * | 12/2003 | Basch et al. ................. 705/38 |
| 2003/0140315 A1 | * | 7/2003 | Blumberg et al. .......... 715/527 |

FOREIGN PATENT DOCUMENTS

| | | |
|---|---|---|
| JP | 10-13589 | 1/1998 |
| JP | 10-302045 | 11/1998 |
| JP | 11-4311 | 1/1999 |

* cited by examiner

Primary Examiner—Gabriel Garcia
Assistant Examiner—Thierry L. Pham
(74) Attorney, Agent, or Firm—McGinn IP Law Group, PLLC

(57) ABSTRACT

A product production system for producing a product ordered by a customer, wherein the product includes an output image for outputting image data received from the customer to another medium. The system includes a first terminal having an image data input unit for inputting the image data; an order information input unit for inputting order information to designate order contents of the product; and an identification information input unit for inputting identification information to identify the order contents; an image data storing unit for storing the image data by associating with said identification information; an order information storing unit for storing order information by associating with the identification information; a second terminal for inputting the identification information as information to be used for authenticating the order information; and a production unit for producing the product designated in the order information after receiving the authenticated order information and the image data.

33 Claims, 11 Drawing Sheets

110

| BAR CODE | PASSWORD | IMAGE DATA | EXPIRY DATE |
|---|---|---|---|
| 2369A | hanako22 | 1. 0001.GIF<br>2. 0002.GIF<br>3. 0003.GIF<br>4. 0004.GIF | JUNE 25, 2001 |
| 5840B | taro1232 | 1. 0001.GIF<br>2. 0002.GIF<br>3. 0003.GIF<br>4. 0004.GIF<br>5. 0005.GIF | JULY 5, 2001 |
| | | | |

*FIG. 5*

| ORDER NO. | BAR CODE | PASSWORD | IMAGE NO. | QUANTITY | FINISHING SPEED | EXPIRY DATE |
|---|---|---|---|---|---|---|
| 1925 | 2369A | hanako22 | 1. | 3 | FAST | MAR. 10, 2000 |
| | | | 2. | 2 | | |
| 2002 | | | 3. | 1 | NORMAL | MAR. 20, 2000 |
| | | | 4. | 2 | | |

| CUSTOMER IDENTIFICATION INFORMATION | ORDER NO. | ORDER DATE | AUTHENTICATION RECORD | RECEIVING DATE |
|---|---|---|---|---|
| ABC-0005 | 1925 | FEB. 10, 2000 | FEB. 20, 2000 | FEB. 20, 2000 |
| | 2002 | FEB. 20, 2000 | FEB. 20, 2000 | FEB. 20, 2000 |
| | ... | ... | ... | ... |
| | ... | ... | ... | ... |

120

PRODUCT PRODUCTION SYSTEM, APPARATUS FOR MANAGING PRODUCTIONS, AND METHOD FOR PRODUCING DESIGNATED PRODUCTS

This patent application claims priority from a Japanese patent application No. 2000-020579 filed on Jan. 28, 2000, the contents of which are incorporated herein by reference.

BACKGROUND OF THE INVENTION

1. Field of the Invention

The present invention relates to a system for producing products, apparatus for managing productions, and a method for producing designated products. In particular, the present invention relates to a system for printing print pictures, which are the output of image data, and a method for producing the print pictures.

2. Description of the Related Art

A print picture service, which prints out image data photographed by a digital camera as high-precision print pictures, is provided. In the print picture service according to the conventional art, customers hand over photographed image data to shops such as photo shops and make orders such as the quantity of the prints. The customers then visit the photo shops again, pay for the prints, and receive printed pictures. Also, customers can make orders for printing by inputting photographed image data from terminals placed in photo shops.

Moreover, a service that reads photo films or developed pictures, converts the read films or pictures to digital image data, and accumulates the converted image data in an image server, is provided. In this case, customers make orders for printing through a network or from terminals placed in shops. Since the above described image server accumulates customers' image data, orders for extra copies of pictures can be received from the customers. The Japanese Patent Applications Laid-Open No. H10-13589, No. H10-302045, and No. H11-4311 disclose a system for recording or sending digital image data with identification information.

In the print picture service according to the conventional art described above, when photographed image data is input and then when orders are made, printers start printing print pictures instantly. Since customers pay for the service in exchange for receiving the printed pictures, shops may incur monetary damages if customers do not come to collect the ordered pictures or input false orders intentionally, for example.

On the other hand, since it takes time for print orders of which customers select image data of their choice and decide the quantity of prints, smooth service can be easily provided if the contents of orders are previously determined.

SUMMARY OF THE INVENTION

Therefore, it is an object of the present invention to provide a product production system, an apparatus for managing productions, and a method for producing designated products, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a product production system for producing a product ordered by a customer, wherein the product includes an output image for outputting image data received from the customer to another medium, the product production system, which includes: a first terminal having: an image data input unit for inputting the image data; an order information input unit for inputting order information to designate order contents of the product; and an identification information input unit for inputting identification information to identify the order contents; an image data storing unit for storing the image data by associating with the identification information; an order information storing unit for storing order information by associating with the identification information; a second terminal for inputting the identification information as information to be used for authenticating the order information; and a production unit for producing the product designated in the order information after receiving the authenticated order information and the image data.

The second terminal may have an access right to authenticate the order information for at least one of the image data storing unit and the order information storing unit.

The order information storing unit may have order expiry date information defining a term to store the order information, and the order information may be authenticated by extending the term determined by the order expiry date information when the identification information is input.

The image data storing unit may have image expiry date information defining a term to store the image data, and the order information may be authenticated by extending the term determined by the image expiry date information when the identification information is input.

The product production system may further include a risk ratio calculating unit for calculating a risk ratio that occurs at the time of producing the product and for outputting alert information, and wherein the production unit may start producing the product in a condition that the alert information is lifted.

The product production system may further include a customer information storing unit for storing information relating to the customer, and wherein: the first terminal may have a customer identification information input unit for inputting customer identification information to identify the information relating to the customer; and the risk ratio calculating unit may calculate a credibility relating to a purchase of the product made by the customer from the information relating to the customer associated with the customer identification information, may calculate the risk ratio based on the credibility, and may output the alert information when the risk ratio is above a predetermined value.

The information relating to the customer includes history information relating to a purchase history of the product of the customer; and the risk ratio calculating unit may calculate the credibility based on the purchase history of the customer.

The product production system may further include a rate calculating unit for calculating a purchase price of the product based on the order information, and wherein the risk ratio calculating unit may calculate the risk ratio based on the purchase price and outputs the alert information when the risk ratio is above a predetermined value.

The first terminal may be placed at a remote place that is at a distant location from the order information storing unit and may be connected to the order information storing unit through a communication network.

The first terminal maybe connected to the order information storing unit through the Internet. The second terminal may display the contents of the order information. The image data storing unit sends the image data and has a means for instructing the first terminal to display the sent image data.

The identification information may be given to the customer in exchange for receiving the image data; and the image data storing unit may instruct the first terminal to display the image data by an input of the identification information from the first terminal.

The identification information may be provided by a bar code and a password associated with the bar code. The identification information input unit may issue the order information when the image data is input by the image data input unit.

The order information input unit may have a means for inputting a priority condition relating to a production of the product as the order information; and the production unit may define a priority order for producing the product during production of a plurality of the products based on the priority condition included in the order information and produces the product based on the priority order.

According to the second aspect of the present invention, a production management apparatus for managing a production of a product ordered from a customer, which includes: an order information input unit for receiving order information that designates order contents of the product; an order information recording unit for recording the order information in an order information storing unit by associating with identification information identifying the order contents; an order information reading unit for reading out from the order information storing unit the order information associated with the identification information after receiving the identification information as a production order to start producing the product; and a task controlling unit for controlling the output of the order information to produce the product based on the order information.

The production management apparatus may further include a risk ratio calculating unit for calculating a risk ratio that occurs at the time of the production of the product and outputting alert information, and wherein the production of the product may be started in a condition that the alert information is lifted.

According to the third aspect of the present invention, a designated product production method for producing a product of which a customer makes an order by designating the contents of the product, which includes: inputting order information that designates order contents of the product; storing the order information by associating with identification information that identifies the order contents; inputting the identification information as a production order to start producing the product; reading out the order information associated with the identification information based on the identification information; and producing the product designated by the order information.

According to the fourth aspect of the present invention, a business method for producing an order product, which a customer designates the contents of the product, which includes: receiving from the customer order information that designates order contents of the product; storing the order information by associating with identification information that identifies the order contents; inputting the identification information as a production order to start producing the product; reading out the order information associated with the identification information based on the production order; and producing the product designated in the read order information and providing the produced product to the customer.

The product may include an output image that has output image data received from the customer; and the business method may further includes storing the image data; and the producing may read out the image data after the identification information is input as the production order.

The business method may further include: receiving customer identification information that identifies information relating to the customer; and calculating by using information relating to the customer associated with the customer identification information a credibility relating to a purchase of the product made by the customer, by using information relating to the customer associated with the customer identification information and calculating a risk ratio that occurs along with the production of the product based on the credibility, and wherein the producing may start producing the product by an input of the order information at the receiving if the risk ratio calculated by the calculating is below a predetermined value.

The information relating to the customer may include a history information relating to a purchase history of the product made by the customer; and the calculating may calculate the credibility based on the history information of the customer.

According to the fifth aspect of the present invention, a recording medium for storing a program that is executed by a computer managing a production of a product ordered from a customer, and the program includes: an order information input module for receiving order information that designates order contents of the product; an order information recording module for recording the order information in an order information storing unit by associating with identification information that identifies the order contents; an order information reading module for receiving the identification information as a production order to start producing the product and reading out order information associated with the identification information from the order information storing unit; and an order information output module for outputting the order information to produce the product based on the order information.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 is a table showing the image data stored in an image data storing unit.

FIG. 6 is a table showing the order information stored in an order information storing unit.

FIG. 7 is a table showing the customer information stored in a customer information storing unit.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
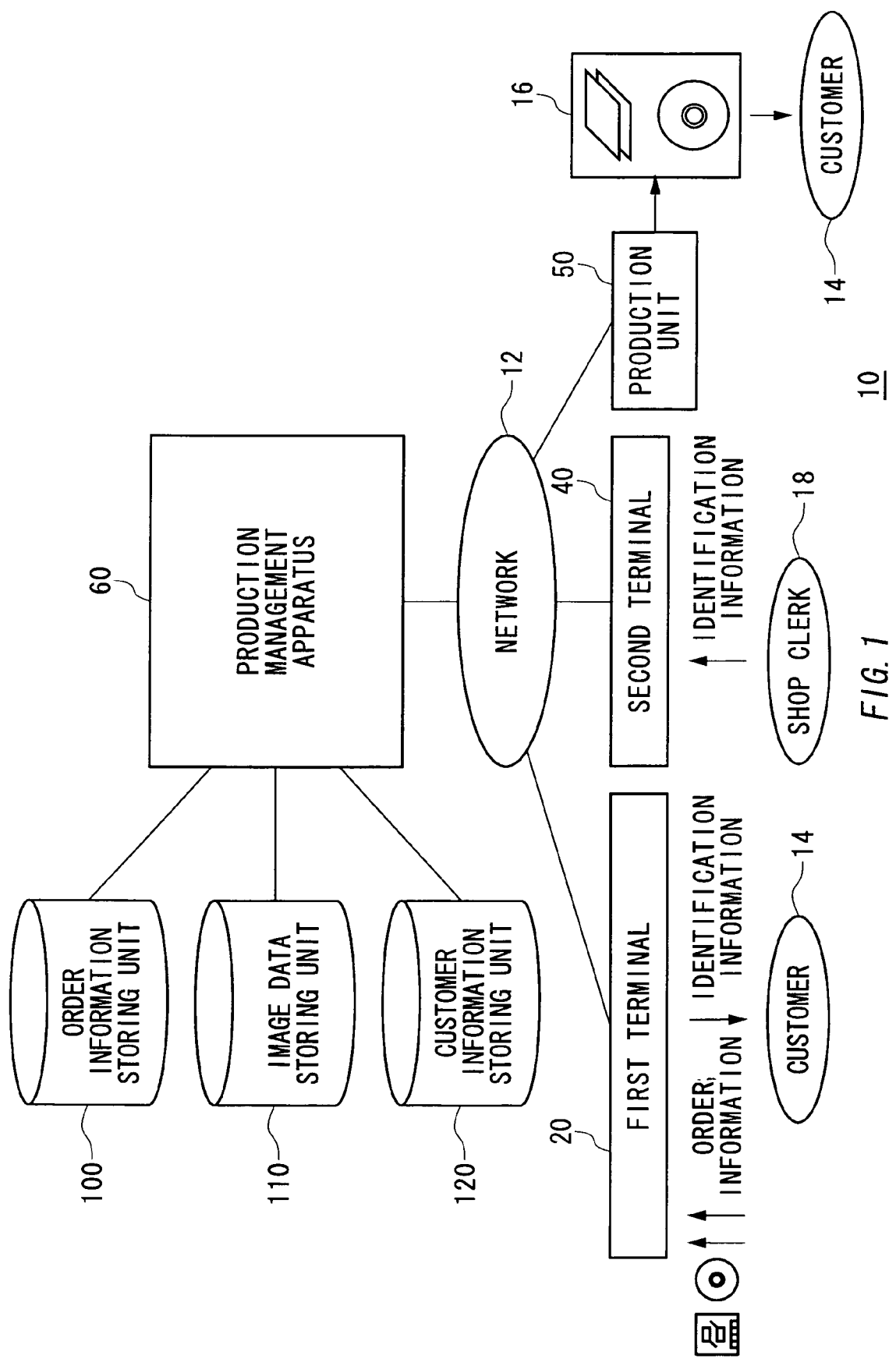
FIG. 1 is a schematic block diagram showing a product production system according to the first embodiment.

FIG. 1 is a schematic block diagram showing a product production system according to the first embodiment. The present embodiment relates to a system for reading out from, for example, memory cards image data photographed by customers using, for example, a digital camera and printing the read-out image data as print pictures.

The product production system 10 produces products for which customers 14 order. The products according to the present embodiment are output images, which are an outputs of image data received from the customers 14 in other forms of media. Here, although a case that output images are printed as print pictures is described as an example, the output image may be provided by being stored in a CD-R, for example. According to the present embodiment, a printer that prints out large quantities with high-speed is used. Thus, orders may be received from a plurality of customers.

The product production system 10 includes a first terminal 20, a second terminal 40, a production unit 50, a production management apparatus 60, an order information storing unit 100, an image data storing unit 110, and a customer information storing unit 120.

The first terminal 20 reads image data photographed by the customer 14 using a device such as a digital camera. The first terminal 20 inputs order information, which the customer 14 designates ordering items such as the quantity of printing print pictures. The first terminal 20 may input customer identification information for identifying information relating to the customer 14. The first terminal 20 includes a display unit for displaying information such as ordered items, and an operation unit for the customer 14 to operate the first terminal 20. The first terminal 20 is placed in stores, such as photo shops, convenience stores, and supermarkets. The first terminal 20 may be placed beyond the view of a shop clerk 18 in stores. If the first terminal 20 is placed where the customer 14 collects the ordered product, the first terminal may be the same terminal as a second terminal, which is described later. The image data may include a plurality of photographed images. A plurality of the first terminal 20 may be placed in stores. The product production system 10 according to the present embodiment responds to a large amount of print orders received from a plurality of customers 14.

The first terminal 20 inputs identification information for identifying the ordered items. The identification information maybe information that the customer 14 himself or herself remembers. The identification information may be information that a store issues. The information that the customer 14 himself or herself remembers maybe, for example, information relating to the identity of the customer 14, such as a telephone number or a birthday. In such a case, the customer manually inputs identification information to the first terminal 20. The information that the store issues may be, for example, order information, which the first terminal 20 issues by the first-ordered-first order, and specific information such as a bar code to distribute in stores. In such cases, the customer 14 may manually input order information to the first terminal 20 or may instruct the first terminal 20 to read the bar code.

The second terminal 40 is an apparatus for re-inputting the identification information input by the first terminal 20 in order to authenticate the order information. The second terminal 40 is placed within view of the shop clerk 18, for example, around the counter where the shop clerk 18 is always in attendance. For example, if the customer 14 gives identification information to the shop clerk 18 at the counter, the shop clerk 18 inputs identification information to the second terminal 40. If the identification information is a bar code, the customer 14 hands out the bar code to the shop clerk 18 and the shop clerk 18 instructs the second terminal 40 to read the bar code. Since the second terminal 40 is placed in view of the shop clerk 18, the customer 14 himself or herself may input identification information to the second terminal 40 in front of the shop clerk 18 as another embodiment. The customer 14 who gives the identification information to the second terminal 40 or the shop clerk 18 may be another person from the person who makes an order for the product 16.

When identification information is re-input to the second terminal 40, the order information input to the first terminal 20 is authenticated as a correct order. The second terminal 40 has an access right to authenticate order information for at least either the order information storing unit 100 and the image data storing unit 110. As an authentication method for order information, an order to start producing may be output to the production unit 50 when the identification information input to the first terminal 20 is input to the second terminal 40, for example.

Thus, even if the first terminal 20 is placed beyond the view of the shop clerk 18, the receival of false orders may be prevented since those who have input an order have to come in front of the shop clerk 18.

Also, since simple information, such as information the customer 14 remembers or bar codes, is used for identification information, the authentication of order information may be easily achieved.

The order information storing unit 100 stores order information input through the first terminal 20 by associating with identification information. The order information storing unit 100 includes order expiry date information, which defines the expiry date for storing order information, and stores order information at least for a predetermined period of time. Moreover, the order information storing unit 100 may authenticate order information by extending the term defined by the order expiry date information when identification information input by the first terminal 20 is re-input to the second terminal 40.

The image data storing unit 110 stores image data input through the first terminal 20 by associating with identification information. The image data storing unit 110 includes image data expiry date information, which defines the expiry date for storing image data information, and stores image data for a predetermined set period of time. Also, the image data storing unit 110 may authenticate order information by extending the term defined by the image data expiry date information when identification information input by the first terminal 20 is re-input to the second terminal.

The customer in formation storing unit 120 stores information relating to the customer 14. The information relating to the customer 14 is, for example, information of each customer 14 relating to the purchase history of products.

The production management apparatus 60 manages the printing of print pictures ordered by the customer 14 by referring to the order information storing unit 100, the image data storing unit 110, and the customer information storing unit 120. The production management apparatus 60 may, for example, instruct the production unit 50 to produce the product 16 designated as order information when the production management apparatus 60 receives from the second terminal 40 an order to start producing. As another embodiment, the production management apparatus 60 may include at least one of the order information storing unit 100, the image data storing unit 110, and the customer information storing unit 120.

The production unit 50 receives authenticated order information and image data and produces the product 16 designated in the order information. The production unit 50 is, for example, a printer for printing print pictures. The printer used as the production unit 50 prints out a large amount of print pictures at a high speed. The production unit 50 receives a large amount of production orders from a plurality of the customers 14 and processes sequentially. The production unit 50 may be placed at a shop where at least either the first terminal 20 or the second terminal 40 is placed. The production unit 50 may undertake a process of production orders input from a plurality of the first terminals 20 place data plurality of shops. As another embodiment, the production unit 50 maybe, for example, a CD-R drive that records image data on a CD-R.

The production unit 50 receives image data from the image data storing unit 110. The production unit 50 receives order information from the order information storing unit 100. The production unit 50 may start producing the product 16 designated in the order information after receiving from the production management apparatus 60 an order to start producing.

The first terminal 20, the second terminal 40, the order information storing unit 100, the image data storing unit 110, the customer information storing unit 120, the production management apparatus 60, and the production unit 50 maybe connected to one another through a network 12. The network 12 may be, for example, a LAN, or Local Area Network, using a means such as an Ethernet. For example, the Internet, such as a public line or a leased line, may be used as the network 12.

The product 16, such as a print picture and a CD-R, produced by the production unit 50 are handed to the customer 14, who made an order, at the shop where at least one of the first terminal 20 and second terminal 40 is placed, in exchange for the payment. Since the production order of the product 16 is authenticated by inputting the identification information twice, shops may be able to expect the customer 16 to come to receive the product 16 without false orders. Thus, damages made by false orders maybe decreased even if the customer 14 pays later in person.

Figure 2:
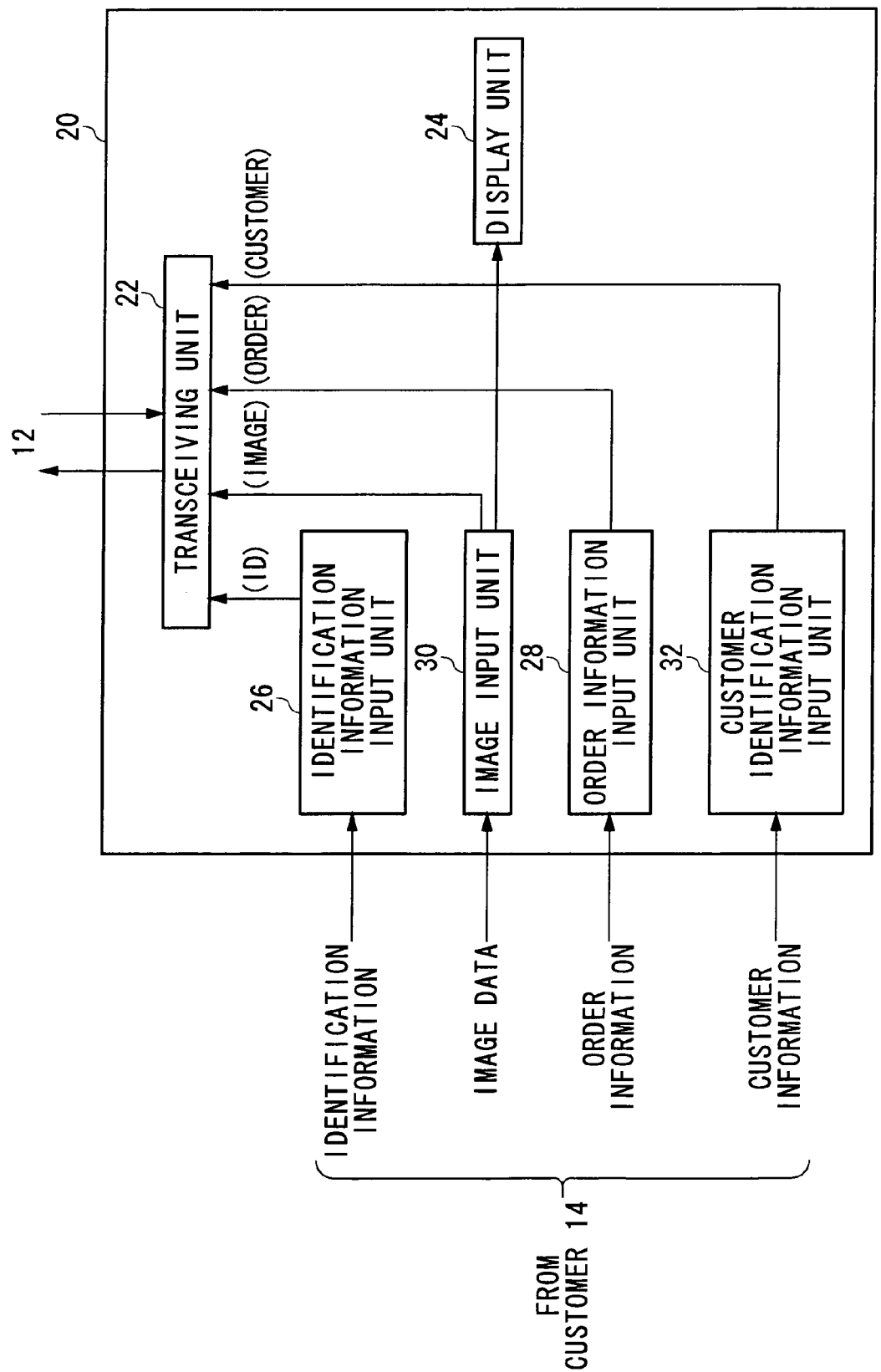
FIG. 2 is a schematic block diagram showing the detailed first terminal according to the first embodiment.

FIG. 2 is a schematic block diagram showing the detailed first terminal 20. The first terminal 20 includes a transceiving unit 22, a display unit 24, an identification information input unit 26, an order information input unit 28, an image data input unit 30, and a customer identification information input unit 32.

The transceiving unit 22 exchanges data with the network 12. The image data input unit 30 includes a slot, which is not shown in the figures, that accepts a memory card or a CD-ROM and the like and reads image data from the memory card or the CD-ROM. The display unit 24 displays image data read by the image data input, unit 30. The order information input unit 28 inputs order information showing the ordering items. The customer 14 may designate an order including, for example, the types of product, the quantity of images, the size of images, the quality of images, the speed, the receiving date, and the like by operating the order information input unit 28. The speed is, for example, selected between the "fast" and "normal." The products 16 designated as "fast" may be produced in advance compared to the products 16 designated as "normal." If the "fast" option is selected, an additional rate may be charged or the quality of the output image may be lowered.

The identification information input unit 26 inputs identification information for identifying image data input by the image data input unit 30. The identification information may be, for example, a bar code printed on a tag card, which is a paper medium. If identification information is in the form of this bar code, a bar code reader is used as the identification information input unit 26. The identification information may include a password associated with a bar code. In such a case, the identification information input unit 26 has a password input unit, which is not shown in the figures, for inputting a password. The tag card is previously placed at, for example, the register counter of a shop. The customer 14 takes a tag card from the register counter and makes the first terminal 20 read the bar code printed on the tag card. The transceiving unit 22 sends identification information to the network 12.

The customer identification information input unit 32 inputs customer identification information that identifies the customer 14. The customer identification information may be, for example, a telephone number or a birthday of the customer 14. The customer identification information may be recorded on a magnetic card or an IC card. In such a case, a magnetic card reader or an IC card reader, for example, is used as the customer identification information input unit 32.

The customer 14 makes the image data input unit 30 read image data. The image data is displayed on the display unit 24. The customer 14 selects an image to print as a print picture by operating the order information input unit 28 according to the instruction displayed on the display unit 24 and inputs the quantity of printing for the respective image. The transceiving unit 22 sends order information with image data to the network 12. Further, the customer 14 may input customer identification information from the customer identification information input unit 32.

Figure 3:
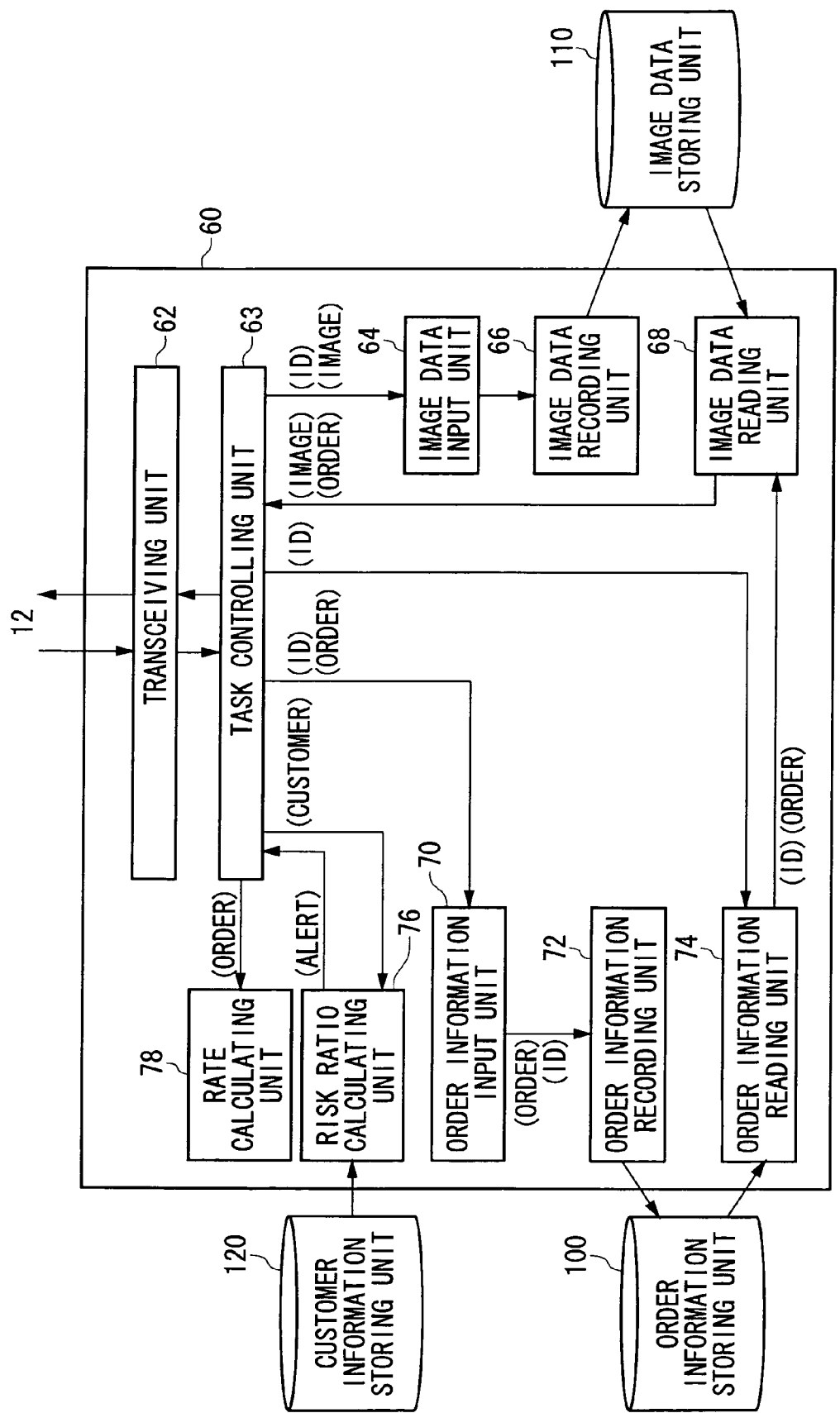
FIG. 3 is a functional block diagram showing the detailed production management apparatus according to the first embodiment.

FIG. 3 is a functional block diagram showing the detailed production management apparatus 60. The production management apparatus 60 includes a transceiving unit 62, a task controlling unit 63, an image data input unit 64, an image data recording unit 66, an image data reading unit 68, an order information input unit 70, an order information recording unit 72, an order information reading unit 74, a risk ratio calculating unit 76, and a rate calculating unit 78.

The transceiving unit 62 exchanges data with the network 12. The task controlling unit 63 controls the entire production management apparatus 60. The image data input unit 64 receives image data and identification information sent from the first terminal 20. The image data recording unit 66 records image data in the image data storing unit 110 by associating with identification information. The image data reading unit 68 receives identification information and order information and reads out the image data associated with the identification information from the image data storing unit 110.

The order information input unit 70 receives order information and identification information sent from the first terminal 20. The order information recording unit 72 records order information in the order information storing unit 100 by associating with identification information.

When identification information is re-input to the second terminal 40, the task controlling unit 63 receives identification information from the second terminal 40 as a production order. Then, the order information reading unit 74 reads out order information associating with the identification information from the order information storing unit 100 and outputs the identification information and the order information to the image data reading unit 68. The image data reading unit 68 reads out the image data associating with the identification information from the image data storing unit 110 and outputs the order information and the image data to the task controlling unit 63. The task controlling unit 63 outputs the order information and the image data to the production unit 50.

The risk ratio calculating unit 76 calculates the ratio of risks that may occur from the printing of the print pictures that are ordered from the customer 14. The customer 14 pays for the printing of the print pictures for which the customer 14 has made an order, at a shop in exchange for receiving the print pictures. Therefore, even if the customer 14 makes an order for the print pictures from the first terminal 20, print charges may not be able to be collected if the customer 14 does not come to collect the print pictures. The risk ratio calculating unit 76 calculates risk ratios based on the probability of the customer 14 to visit the register counter to collect the print pictures or on the damages that may occur if the payment for the print pictures is not made.

The risk ratio calculating unit 76 may receive customer identification information input from the first terminal 20. The risk ratio calculating unit 76 may calculate the credibility of the customer 14 by referring to the customer information associated with the customer identification information. The credibility of the customer 14 is, for example, the ratio that the customer may pay for the printing of the print pictures by referring to the purchase history of the customer 14. If the credibility of the customer 14 is high, the risk ratio becomes low, and if the credibility of the customer 14 is low, the risk ratio becomes high.

The rate calculating unit 78 calculates the rate for the printing of the print pictures based on the order information input by the customer using the first terminal 20. The risk ratio calculating unit 76 may calculate the risk ratio based on the rate for the printing calculated by the rate calculating unit 78.

The task controlling unit 63 refers to the risk ratio calculating unit 76 when identification information is input from the second terminal 40. If the risk ration is below the predetermined value, the task controlling unit 63 may output to the image data reading unit 68 identification information and order information associated with the identification information and may instruct the production unit 50 to start producing the product. Also, if the credibility of the customer 14 is above the predetermined value, the production may be started, for example. Moreover, if the rate for the printing calculated by the rate calculating unit 78 is below the standard amount, the production may be started.

On the other hand, if the risk ratio is larger than the predetermined value, the risk ratio calculating unit 76 outputs alert information to the second terminal 40. When the shop clerk 18 who sees the alert information gives an instruction to start producing the product 16, the shop clerk 18 inputs to the second terminal 40 an order to lift the alert information. The task controlling unit 63 may output order information and image data to the production unit 50 in the condition that the task controlling unit received from the second terminal 40 a lift order of the alert information. In such a case, the production unit 50 starts producing the product 16 in the condition that alert information is lifted.

Also in such a case, the production of the product 16 does not start producing the product 16 if the shop clerk 18 does not input a lift order when the risk ratio is high, which is recognized by the authentication made by inputting identification information from the second terminal 40. Therefore, the damages made by false orders maybe decreased even if the customer 14 pays later in person.

Figure 4:
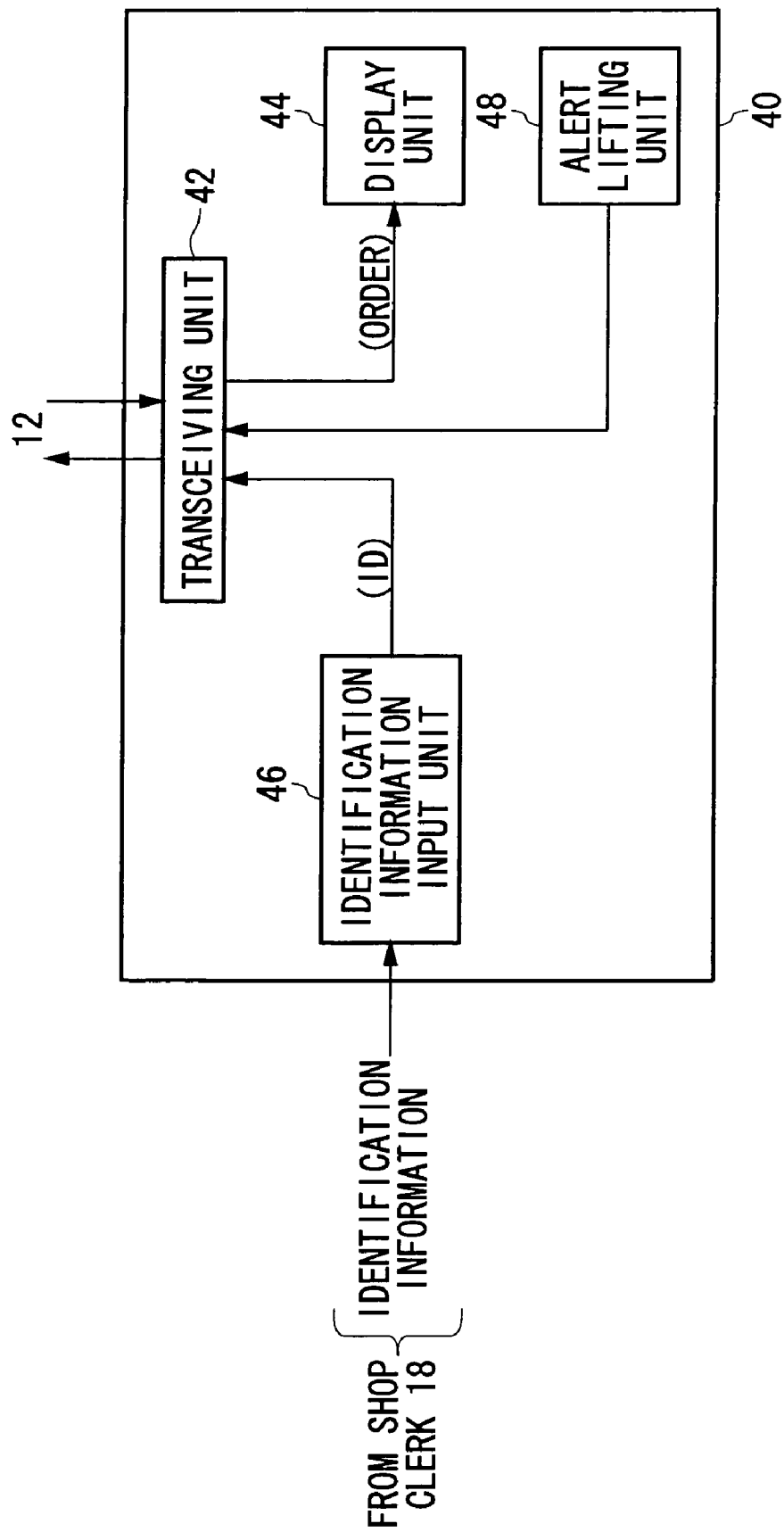
FIG. 4 is a functional block diagram showing the detailed second terminal according to the first embodiment.

FIG. 4 is a functional block diagram showing the detailed second terminal 40. The second terminal 40 is placed in view of the shop clerk 18, for example, around the counter where the shop clerk is always in attendance. The second terminal 40 includes a transceiving unit 42, a display unit 44, an identification information input unit 46, and an alert lifting unit 48. The second terminal 40 has an access right to authenticate order information to at least either the image data storing unit 110 or the order information storing unit 100.

The transceiving unit 42 exchanges data with the network 12. The display unit 44 displays order information received from the network 12 to check the received order information on the display unit 44. The identification information input unit 46 may be a bar code reader that reads identification information the same as the identification information input unit 26 of the first terminal 20. When alert information is output from the production management apparatus 60, an order for lifting the alert information is input by the shop clerk 18 to the alert lifting unit 48.

The customer 14 brings the tag card with a bar code and goes to the counter where the second terminal 40 is placed. The customer 14 hands over the tag card to the shop clerk 18, and the shop clerk makes the identification information input unit 46 read the bar code. The identification information input unit 46 of the second terminal 40 may be placed on the counter in view of the shop clerk 18. In such a case, the customer 14 himself or herself may make the bar code of the tag card read. The production management apparatus 60 receives identification information from the second terminal 40 through the network 12 as an order to start producing the products 16.

The second terminal 40 may receive order information from the production management apparatus 60 and may display the received order information on the display unit 44. The display unit 44 may display alert information received by the production management apparatus 60. The shop clerk 18 confirms the order information and the alert information on the display unit 44.

FIG. 5 is a table showing the image data stored in the image data storing unit 110. The image data table associates a bar code with a password, image data, and an expiry date. Here, the identification information is provided by a bar code and a password. The identification information is given to the image data including a plurality of photographed images. A respective image number is given to photographed images. The image data is stored in formats of a JPEG, or Joint Photographic Experts Group, or a GIF, or Graphics Interchange Format, for example. The expiry date is a term that the image data storing unit 110 stores the image data. When the term expires, the image data stored in the image data storing unit 110 is deleted.

FIG. 6 is a table showing the order information stored in the order information storing unit 100. The order information table associates an order number with a bar code, a password, an image number, a quantity, a finishing speed, and an expiry date. The order number is a number given to each order of printing print pictures. The order information is given by the order number and the quantity for each image. The expiry date is a term that the order information storing unit 100 stores the order information. When the term expires, the order information stored in the order information storing unit 100 is deleted. The order information may further include a product type, an image size, an image quality, and a receiving date, for example.

FIG. 7 is a table showing the customer information stored in a customer information storing unit 120. The customer information table associates customer identification information with an order number, an order date, an authentication record, and a receiving date. The customer information table shows history information relating to a customer's purchase history pf print pictures. The customer information table shows order information that the customer 14 made for printing print pictures from the first terminal 20, a record whether the customer 14 input identification information from the second terminal 40 and authenticated order information, and information on whether the customer 14 actually paid for the collected print pictures. Even if the customer 14 inputs identification information from the second terminal 40 and authenticates the order information, the risk ratio of those who have a history of not actually coming to collect print pictures is calculated as high.

Figure 8:
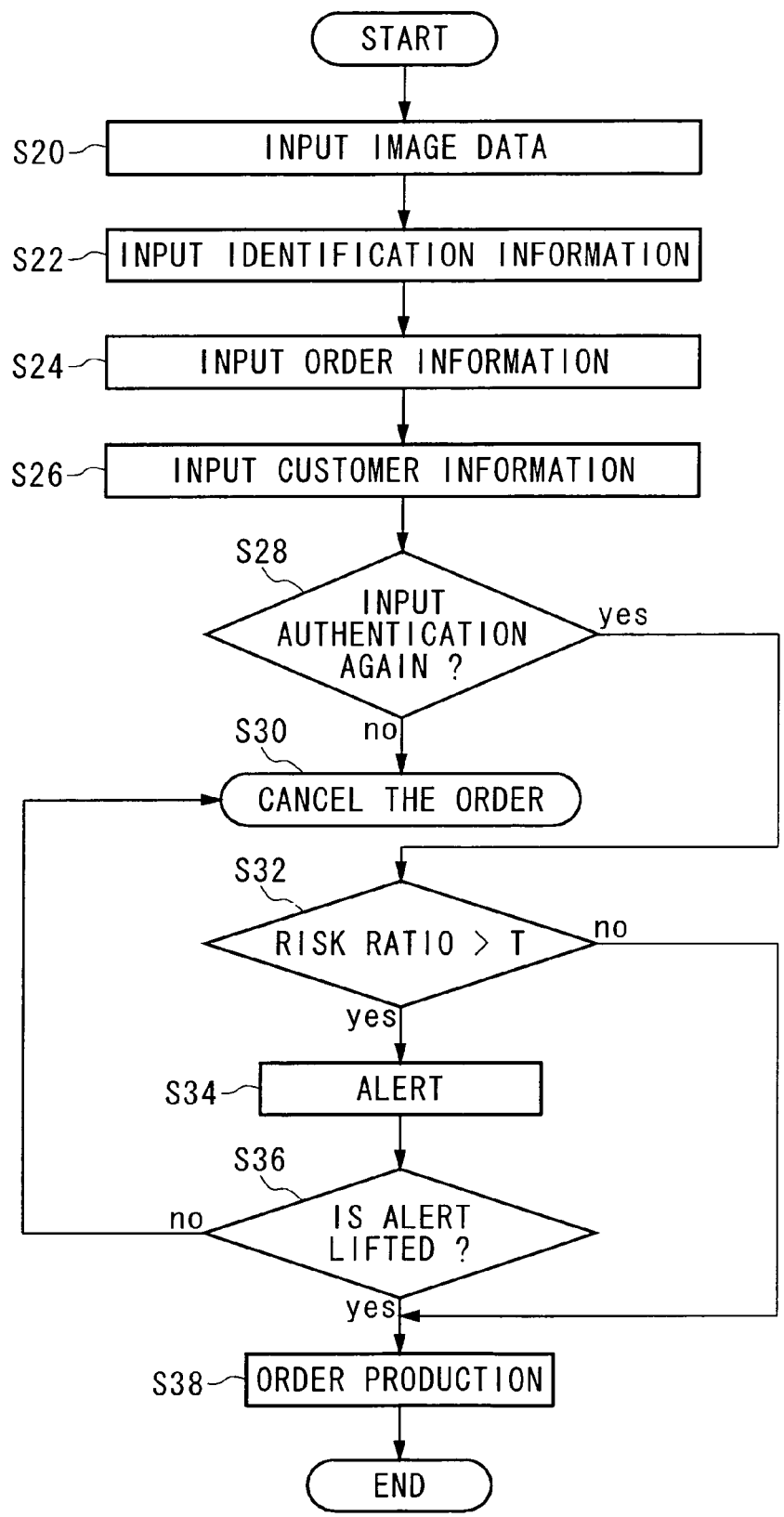
FIG. 8 is a flowchart showing the process of a product production managed by a production management apparatus.

FIG. 8 is a flowchart showing the process of a product production managed by the task controlling unit 63 of the production management apparatus 60.

The task controlling unit 63 receives image data, at step S20. The image data storing unit 110 stores image data by associating with identification information, at step S22. The order information storing unit 100 stores order information by associating with identification information, at step S24. The task controlling unit 63 may receive customer information, at step S26. The task controlling unit 63 waits for an input of identification information for authenticating the order information made by the second terminal 40,at step S28. If identification information is not input from the second terminal 40 within a predetermined period of time, the task controlling unit 63 cancels the order by deleting the order information from the order information storing unit 100, at step S30. If identification information is input from the second terminal 40 within a predetermined period of time, the task controlling unit 63 instructs the risk ratio calculating unit 76 to calculate the risk ratio, at step S32. If customer identification information is input, the risk ratio calculating unit 76 may calculate the risk ratio based on customer identification information. If the risk ratio calculated by the risk ratio calculating unit 76 is below a predetermined value, the task controlling unit 63 outputs to the production unit 50 image data and order information as orders for starting a production, at step S38.

If the risk ratio calculated by the risk ratio calculating unit 76 is larger than a predetermined value, the task controlling unit 63 outputs alert information to the second terminal, at step S34. If the task controlling unit 63 does not receive a lift order within a predetermined period of time, at step S36, the task controlling unit 63 cancels the order by deleting order information from the order information storing unit 100, at step S30. If the task controlling unit 63 receives a lift order within a predetermined period of time, at step S36, the task controlling unit 63 outputs to the production unit 50 image data and order information as an order to start producing, at step S38.

According to the present embodiment, the memory card that recorded image data to be read by the first terminal 20 may be, for example, a semi-conductor memory such as an EEPROM or a compact hard disk. Also, if the first terminal 20 is a personal computer and computer peripherals that the customer 14 has, image data may be read by a magnetic disk, optical disk, or optical magnetic disk.

The second embodiment according to the present invention is described in the following. The present embodiment relates to a system that the customer 14 previously converts photo films photographed by the customer 14 to image data, orders desired images from image data, and then prints out the ordered images as print pictures.

Figure 9:
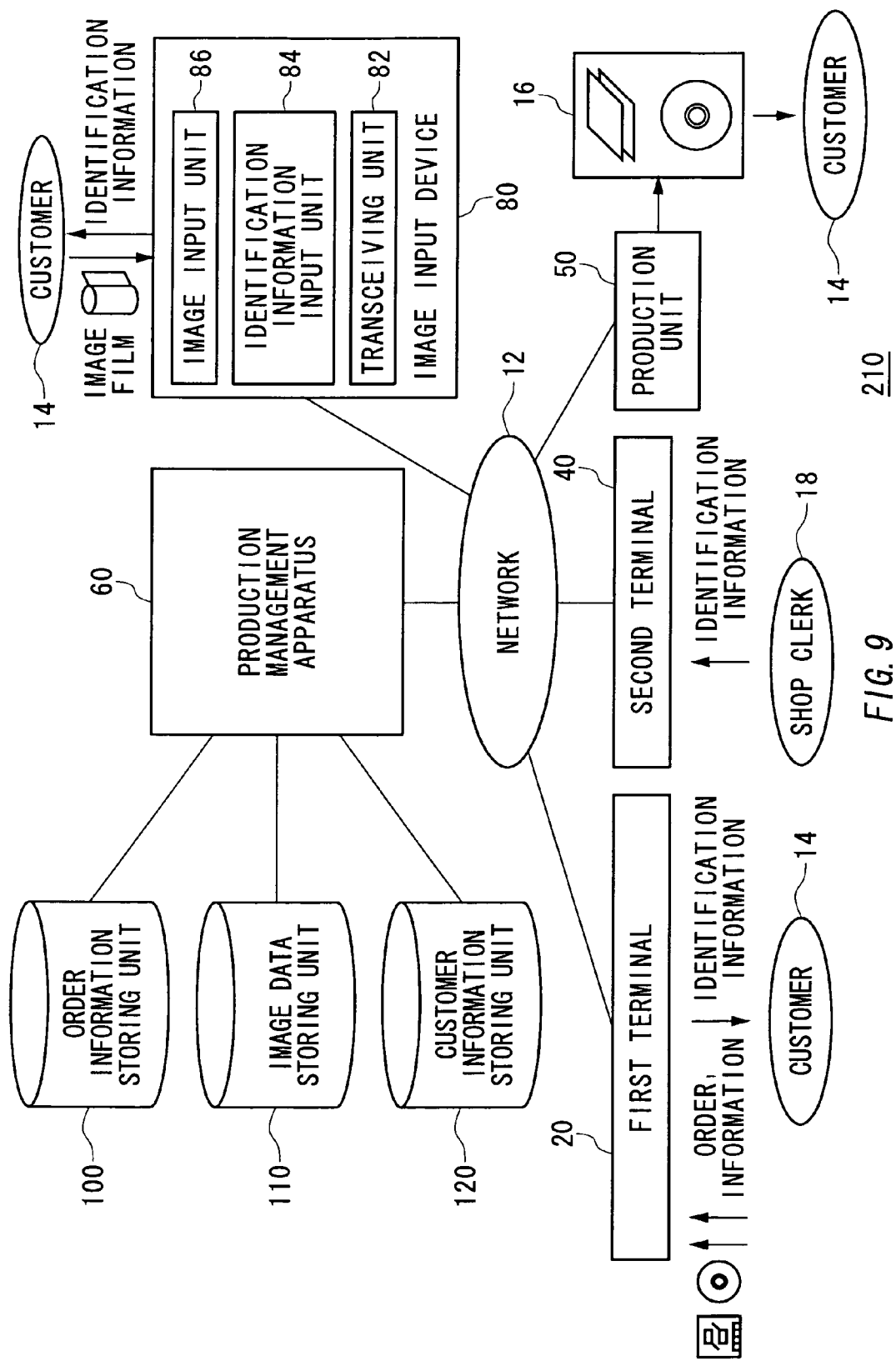
FIG. 9 is a functional block diagram showing a production management system according to the second embodiment.

FIG. 9 is a functional block diagram showing a production management system according to the second embodiment. The production management system 210 according to the present embodiment includes a first terminal 20, a second terminal 40, a production unit 50, a production management apparatus 60, an image input device 80, an order information storing unit 100, an image data storing unit 110, and a customer information storing unit 120. The production management system 210 according to the present embodiment includes almost the same structural elements as the product production system 10 according to the first embodiment shown in FIG. 1, except for the first terminal 20 and the image input device 80.

The image input device 80 is, for example, a scanner for reading photo films and converting the read image into digital image data. The scanner used as the image input device 80 is a film scanner that converts photo films into digital images at a high speed or a photo scanner that converts print pictures into digital images.

The image input device 80 includes a transceiving unit 82, an identification information input unit 84, and an image input unit 86. The transceiving unit 82 exchanges data with a network 12. The image input unit 86 is the scanner body that converts photo films into digital images. The identification information input unit 84 reads identification information that identifies image data input from the image input unit 86. The image data converted by the image input unit 86 is stored in the image data storing unit 110 by associating with identification information. The identification information according to the present embodiment is given by a bar code on a tag card of a paper medium. The identification information input unit 84 is a bar code reader.

According to the present embodiment, firstly the customer 14 leaves a photo film at the counter of a photo shop or the like. A shop clerk makes the image input unit 86 of the image input device 80 read the photo film received from the customer 14. Then the shop clerk 18 makes the identification information input unit 84 read the tag card that has identification information. The image data is sent to the production management apparatus 60 along with identification information. The production management apparatus 60 records image data in the image data storing unit 110 by associating with identification information. The shop clerk 18 then hands over a tag card having identification information to the customer 14. Here, the identification information is, for example, associated with a plurality of images included in one photo film. If the customer 14 leaves a plurality of photo films, the identification information may be associated with a plurality of images included in those photo films.

Figure 10:
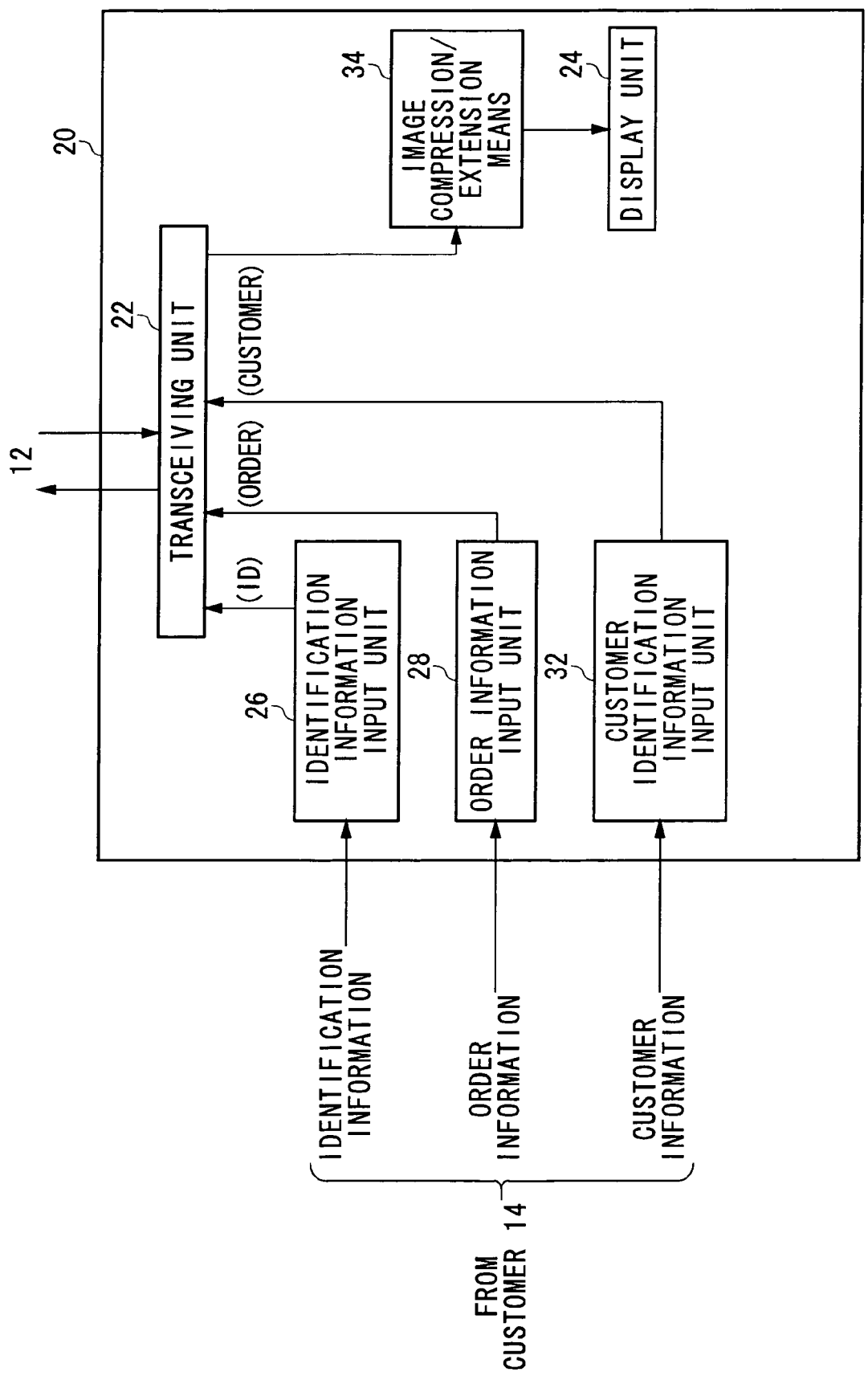
FIG. 10 is a functional block diagram showing the detailed first terminal according to the second embodiment.

FIG. 10 is a functional block diagram showing the detailed first terminal according to the second embodiment. The customer 14 makes an order from the first terminal 20 for printing print pictures of the image data recorded in the image data storing unit 110. The first terminal 20 displays the image data corresponding to the identification information when the customer 14 inputs the identification information. The first terminal 20 includes an image compression/extension means 34. The image compression/extension means 34 compresses or extends the image data received by the transceiving unit 22 and displays the compressed or extended image data on the display unit 24.

Therefore, the customer 14 may be able to check the photographed images of the photo film on the display unit 24 of the first terminal 20 and order print pictures by selecting only images that the customer wants to print out.

The customer 14 makes the identification information input unit 26 read the tag card having identification information. The transceiving unit 22 sends identification information to the production management apparatus 60. The production management apparatus 60 receives identification information through the network 12. If the image data associated with the identification information input from the identification information input unit 26 is stored in the image data storing unit 110, the production management apparatus 60 sends the image data to the first terminal 20. The transceiving unit 22 receives the image data sent from the production management apparatus 60. The image compression/extension means 34 extends the image data and displays the extended image data on the display unit 24. The image compression/extension means 34 otherwise displays the image data as compressed images on the display unit 24. The customer 14 selects from the order information input unit 28 images that he or she wants to print out as print pictures according to the instruction displayed on the display unit 24 and inputs order information, such as the quantity, for each image. The transceiving unit 22 sends the order information. The production management apparatus 60 receives the order information through the network 12. The customer 14 may input customer identification information from the customer identification information input unit 32.

The display unit 24 of the first terminal 20 displays image data. The customer 14 makes an order for printing print pictures in the same way as the first embodiment.

According to the present embodiment, the authentication of order information is easily achieved by using identification information that identifies image data read from photo films.

According to the present embodiment, the image input unit 86 may be able to convert, for example, developed pictures and posters into image data. The production unit 50 and the image input device 80 described in the present embodiment may be achieved by the same apparatuses.

As another embodiment of the first and second embodiments, if order information is input from the first terminal 20, the production management apparatus 60 may instruct the risk ratio calculating unit 76 to calculate the risk ratio and may instruct the production unit 50 to start printing print pictures if the risk ratio is below a predetermined value.

For example, the credibility of the customer 14 may be calculated from the customer identification information input from the first terminal 20. If the credibility is high, the production unit 50 instantly starts printing print pictures when the customer 14 inputs order information to the first terminal 20. On the other hand, if the credibility is low, the production unit 50 starts printing print pictures when the customer 14 inputs order information to the first terminal 20 and re-inputs identification information from the second terminal 40.

Also, risk ratios maybe calculated based on the print charge calculated by the rate calculating unit 78. If the charge is low, the production unit 50 instantly starts printing print pictures when the customer 14 inputs order information to the first terminal 20. On the other hand, if the charge is high, the production unit 50 starts printing print pictures when the customer 14 inputs order information to the first terminal 20 and re-inputs identification information from the second terminal 40.

Since photo prints are not printed until the customer 14 re-inputs identification information from the second terminal 40 when the risk ratio is high, monetary damages of shops may be decreased, as well as being able to make a print order of print pictures easier since the customer 14 does not need to re-input identification information from the second terminal 40 when the risk ratio is low.

As another embodiment of the first and second embodiments, the first terminal 20 may be placed at remote places from the shops. For example, the first terminal 20 may be a personal computer and computer peripherals placed at a customer's home. In such a case, the customer 14 may be able to confirm a large amount of orders or troublesome orders outside of shops and make a temporary order.

Figure 11:
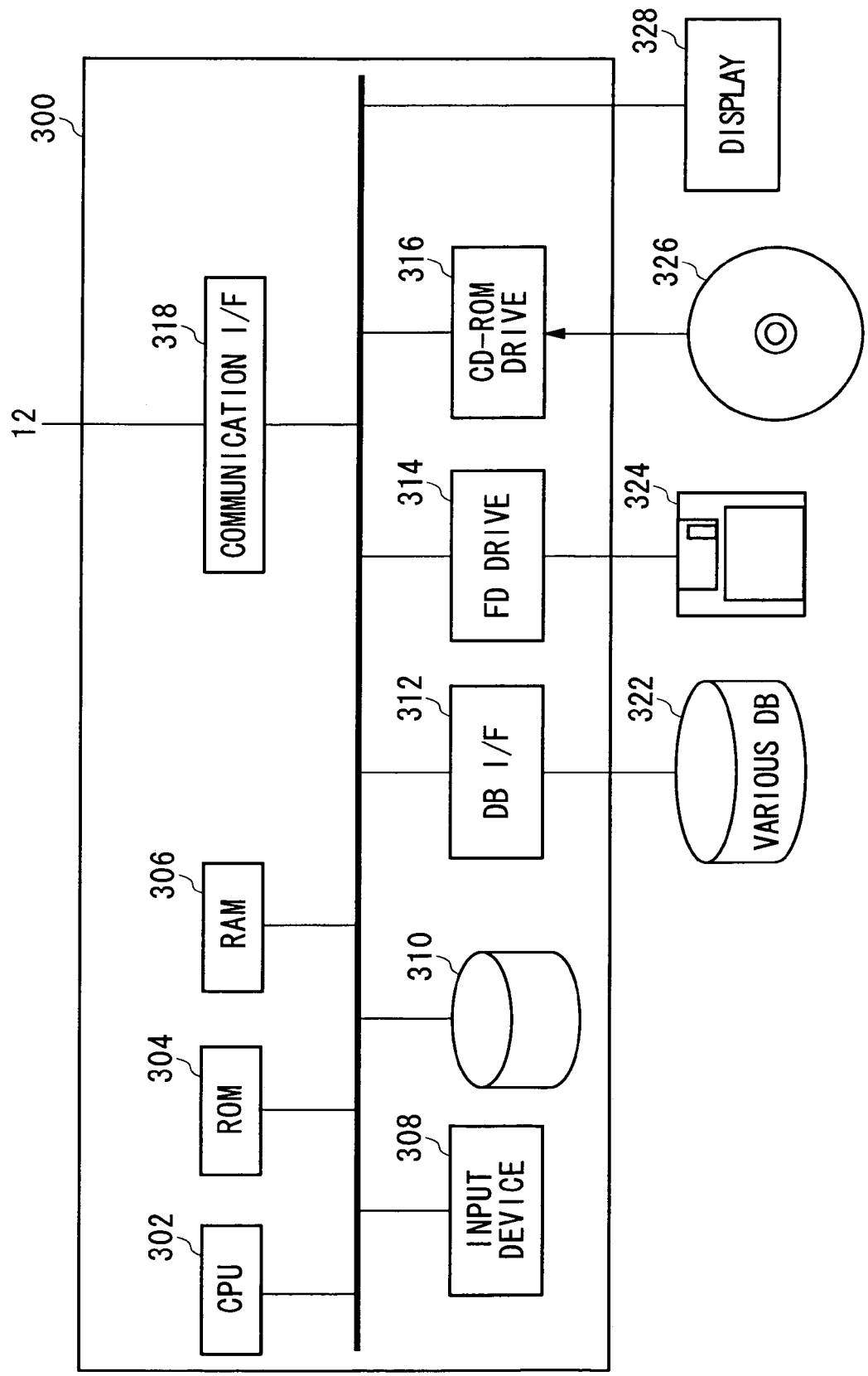
FIG. 11 is a functional block diagram showing the hardware structure of a multipurpose computer that functions as the production management apparatus according to the first and second embodiments.

FIG. 11 is a functional block diagram showing the hardware structure of a multipurpose computer that function as the production management apparatus 60 according to all the embodiments described in the present invention.

The production management apparatus 60 according to all the embodiments described in the present invention may be achieved by a multipurpose computer. In FIG. 11, a CPU 302 of a computer 300 operates based on a program stored in a ROM disk or a RAM disk. Managers of the production management apparatus 60 may be able to input data and commands by using an input device 308. A hard disk drive 310 as an example of a storage device stores a program that operates setting information and the CPU 302.

A floppy disk drive 314 reads data or a program from a floppy disk 324 and provides the read data or program to the CPU 302. A CD-ROM drive 316 reads data or a program from a CD-ROM and provides the read data or program to the CPU 302. A communication interface 318 connects to the network 12 and sends and receives data with the first terminal 20, the second terminal 40, the production unit 50, and the image input device 80. The database interface 312 connects with various databases 322, such as the order information storing unit 100, the image data storing unit 110, and the customer information storing unit 120, and sends and receives data in those databases. Moreover, the computer 300 is provided with an interface for connecting to a display 328. The managers may be able to monitor the operation conditions of the production management apparatus 60 and check the setting information.

The software executed by the CPU 302 is stored in a recording medium, such as the floppy disk 324 or the CD-ROM 326, and is provided to users. The software stored in the recording medium may be compressed or non-compressed. The software is installed to the hard disk drive 310 from the recording medium, read out to the RAM 306, and executed by the CPU 302.

The software provided by being stored in the recording medium, that is, the software installed in the hard disk drive 310 includes an order information input module, an order information recording module, an order information reading module, and an order information output module, as functional structures.

Since the processes, which the above modules works with the computer 300 and instructs the CPU 302 to undertake, are the same functions and operations as the order information input unit 70, the order information recording unit 72, the order information reading unit 74, and the transceiving unit 62, corresponding to all of the embodiments described in the present application, the descriptions are omitted here.

The floppy disk 324 or the CD-ROM 326, shown in FIG. 11, as an example of a recording medium may store apart of the operations or all of the functions of the production management apparatus 60 according to all the embodiments described in the present application. The floppy disk 324 or the CD-ROM 326 may store a part of the operations of the first terminal 20, the second terminal 40, and the production unit 50, according to all the embodiments described in the present application.

These programs may be read from a recording medium and executed directly to the RAM disk 306 or read out to the RAM disk 306 after being temporarily installed in the hard disk drive 310 and executed. Moreover, the above programs may be stored in one recording medium or a plurality of recording media. Further, those programs may be stored in coded formats.

An optical recording medium, a magnetic recording medium such as an MD, an optical magnetic recording medium such as a PD, a tape medium, and a semiconductor memory such as an IC card or a miniature card, may be used as a recording medium other than the floppy disk 324 and the CD-ROM 326. Also, a storage device such as a hard disk or a RAM disk set in a server system connected to a leased communication line or the Internet may be used as a recording medium, and the programs may be provided to the computer 300 through the communication networks. These recording media are used only for manufacturing the production management apparatus 60, and thereby it is obvious that manufacturing or selling of those recording media as a business constitute an infringement of the patent right based on the present application.

The structural elements of the second terminal 40 and the production unit 50 described in all the embodiments of the present application may be achieved by one apparatus. Also, the transceiving unit 42 of the second terminal 40 may receive image data and order information from the image data storing unit 110 and the order information storing unit 100, respectively, and may output to the production unit 50 that image data and order information through a leased line.

Moreover, the structural elements of the production unit 50 and the production management apparatus 60 described in all the embodiments in the present application may be achieved by the same apparatus. Various databases, such as the order information storing unit 100, the image data storing unit 110, and the customer information storing unit 120, may be connected to the production management apparatus 60 through a communication line, such as the Internet, or a local communication line, such as a LAN.

The identification information input unit 26 of the first terminal 20 may be a receipt printer that issues a receipt having a reference number, according to all the embodiments described in the present application. The customer 14 may receive the receipt having a reference number and input the reference number as identification information.

According to the embodiments of the present invention, the first terminal 20 may have a means for processing images displayed on the display unit 24, though the means is not shown in the figures.

According to the product production system 10 of the first embodiment, since order information is authenticated by inputting identification information from the second terminal 40 placed at a place where the shop clerk 18 can monitor, false orders may be prevented even if the first terminal 20 is placed beyond the view of the shop clerk 18 as the customer 14 who input an order has to come in front of the shop clerk 18. Also, the authentication of order information may be able to be easily achieved since simple information, such as information the customer 14 himself or herself remembers or a bar code, is used as identification information.

According to the product production system 10 of the second embodiment, the customer 14 may be able to check the photographed images of the photo film on the display unit 24 of the first terminal 20 and order print pictures by selecting only images that the customer wants to print out. Also, the authentication of order information may be able to be easily achieved by using identification information that identifies image data read from photo films.

Moreover, according to the product production system 10 of another embodiment, since photo prints are not printed until the customer 14 re-inputs identification information from the second terminal 40 when the risk ratio is high, monetary damages of shops may be decreased, as well as being able to make a print order of print pictures more easily since the customer 14 does not need to re-input identification information from the second terminal 40 when the risk ratio is low.

Further, according to the product production system 10 of another embodiment, the customer 14 may be able to confirm a large amount of orders or troublesome orders outside of shops and make a temporary order.

As is obvious from the above description, the credibility of an order before starting a production becomes easier to heighten even if the charge for the service is paid later in person, according to the present invention.

Although the present invention has been described by way of exemplary embodiments, it should be understood that those skilled in the art might make many changes and substitutions without departing from the spirit and the scope of the present invention which is defined only by the appended claims.

What is claimed is:

1. A production management apparatus for managing a production of printing pictures ordered from a customer, comprising:

an order information input unit for receiving order information that designates order contents of the printing pictures;

an order information recording unit for recording said order information in an order information storing unit by associating with identification information identifying said order contents;

an order information reading unit for reading out from said order information storing unit said order information associated with said identification information after receiving said identification information as a production order to start producing the printing pictures;

a risk ratio calculating unit for calculating a credibility relating to a purchase of the printing pictures made by the customer from information relating to the customer associated with customer identification information, calculating a risk ratio based on said credibility, and outputting said alert information when said risk ratio is above a predetermined value;

a task controlling unit for controlling the output of said order information to produce the printing pictures based on said order information; and an image data storing unit for storing image data, wherein said image data stored in said image data storing unit is deleted when a term to store said image data is expired, wherein the production management apparatus manages a printing of print pictures ordered by a customer by referring to the order information storing unit and the image data storing unit, wherein a first terminal of a production system is connected to the production management apparatus via a network, wherein a second terminal of a production system is connected to the first terminal and the production management apparatus via the network, wherein the second terminal has an access right to authenticate the order information for at least one of said image data storing unit and said order information storing unit, wherein said identification information is given to the customer in exchange for receiving the image data, and wherein said image data storing unit instructs said first terminal to display the image data by an input of said identification information from said first terminal.

2. The production management apparatus as claimed in claim 1, wherein said risk ratio calculating unit calculates said risk ratio at a time of the production of the printing pictures, wherein the production of the printing pictures is started in a condition that said alert information is lifted.

3. The production management apparatus as claimed in claim 1, wherein said task controlling unit temporarily stops producing the printing pictures designated in said order information according to said alert information.

4. The production management apparatus as claimed in claim 3, wherein said task controlling unit resumes producing the printing pictures designated in said order information after said order information is inputted.

5. A designated production method for producing printing pictures of which a customer makes an order by designating the contents of the printing pictures, comprising:

inputting order information that designates order contents of the printing pictures;

storing said order information by associating with identification information that identifies said order contents;

inputting said identification information as a production order to start producing the printing pictures;

reading out said order information associated with said identification information based on said identification information;

calculating a credibility relating to a purchase of the printing pictures made by the customer from information relating to the customer associated with customer identification information, calculating a risk ratio based on said credibility, and outputting said alert information when said risk ratio is above a predetermined value;

producing the printing pictures designated by said order information;

storing image data, wherein said image data is deleted when a term to store said image data is expired;

managing a printing of print pictures ordered by a customer by referring to said order information and the image data;

authenticating the order information for at least one of said storing image data and said storing said order information; and displaying the image data by an input of said identification information, wherein said identification information is given to the customer in exchange for receiving the image data.

6. The designated production method as claimed in claim 5, further comprising:

temporarily stopping producing the printing pictures designated in said order information according to said alert information.

7. The designated production method as claimed in claim 6, further comprising:

resuming producing the printing pictures designated in said order information after said order information is inputted.

8. A business method for producing printing pictures, which a customer designates the contents of the printing pictures, comprising:

receiving from the customer order information that designates order contents of the printing pictures;

storing said order information by associating with identification information that identifies said order contents;

inputting said identification information as a production order to start producing the printing pictures;

reading out said order information associated with said identification information based on said production order;

calculating a credibility relating to a purchase of the printing pictures made by the custom from information relating to the customer associated with customer identification information, calculating a risk ratio based on said credibility, and outputting said alert information when said risk ratio is above a predetermined value;

producing the printing pictures designated in said read order information and providing the produced printing pictures to the customer;

storing image data, wherein said image data is deleted when a term to store said image data is expired;

managing a printing of print pictures ordered by a customer by referring to the order information and the image data;

authenticating the order information for at least one of said storing image data and said storing said order information; and displaying the image data by an input of said identification information, wherein said identification information is given to the customer in exchange for receiving the image data.

9. The business method as claimed in claim 8, wherein the printing pictures comprises an output image that has output image data received from the customer, wherein the business method further comprises storing the image data, and wherein said producing reads out the image data after said identification information is input as said production order.

10. The business method as claimed in claim 8, further comprising:

receiving said customer identification information that identifies said information relating to the customer; and wherein said producing starts producing the printing pictures by an input of said order information at said receiving if said risk ratio calculated by said calculating is below a predetermined value.

11. The business method as claimed in claim 8, wherein said information relating to the customer comprises a history information relating to a purchase history of the printing pictures made by the customer, and
wherein said calculating calculates said credibility based on said history information of the customer.

12. The business method as claimed in claim 8, further comprising:
temporarily stopping producing the printing pictures designated in said order information according to said alert information.

13. The business method as claimed in claim 12, further comprising:
resuming producing the printing pictures designated in said order information after said order information is inputted.

14. A recording medium for storing a program that is executed by a computer managing a production of printing pictures ordered from a customer, the program comprising:
an order information input module for receiving order information that designates order contents of the printing pictures;
an order information recording module for recording said order information in an order information storing unit by associating with identification information that identifies said order contents;
an order information reading module to receiving said identification information as a production order to start producing the printing pictures and reading out order information associated with said identification information from said order information storing unit;
a risk ratio calculating module for calculating a credibility relating to a purchase of the printing pictures made by the customer from information relating to the customer associated with customer identification information, calculating a risk ratio based on said credibility, and outputting said alert information when said risk ratio is above a predetermined value;
an order information output module for outputting said order information to produce the printing pictures based on said order information;
an image data storing module for storing image data, wherein said image data stored in said image data storing module is deleted when a term to store said image data is expired;
a production management module for managing a printing of print pictures ordered by a customer by referring to said order information storing unit and said image data storing module; and
an authentication module for authenticating the order information for at least one of said image data storing module and said order information storing unit,
wherein said identification information is given to the customer in exchange for receiving the image data, and
wherein said image data storing module instructs a first terminal to display the image data by an input of said identification information from the first terminal.

15. The recording medium as claimed in claim 14, wherein said order information output module temporarily stops producing the printing pictures designated in said order information according to said alert information.

16. The recording medium as claimed in claim 15, wherein said order information output module resumes producing the printing pictures designated in said order information after said order information input module inputs said order information.

17. A production system for producing printing pictures ordered by a customer, the product production system comprising:
a first terminal;
a second terminal;
an order information input unit that inputs order information to designate order contents of the printing pictures;
an identification information input unit that inputs identification information to identify said order contents;
a risk ratio calculating unit that calculates a credibility relating to a purchase of the printing pictures made by the customer from information relating to the customer associated with customer identification information, calculating a risk ratio based on said credibility, and outputting said alert information when said risk ratio is above a predetermined value;
a production unit that produces the printing pictures designated in said order;
an image data storing unit for storing image data, wherein said image data stored in said image data storing unit is deleted when a term to store said image data is expired; and
a production management apparatus for managing a printing of print pictures ordered by a customer by referring to the image data storing unit and the order information input unit,
wherein the first terminal is connected to the production management apparatus via a network,
wherein the second terminal is connected to both the first terminal and the production management apparatus via the network,
wherein said second terminal has an access right to authenticate said order information for at least one of said image data storing unit and said order information input unit,
wherein said identification information is given to the customer in exchange for receiving the image data, and
wherein said image data storing unit instructs said first terminal to display the image data by an input of said identification information from said first terminal.

18. A production system for producing printing pictures ordered by a customer, wherein the printing pictures comprises an output image for outputting image data received from the customer to another medium, the printing pictures production system comprising:
a production management apparatus;
a first terminal comprising:
an image data input unit for inputting the image data;
an order information input unit for inputting order information to designate order contents of the printing pictures; and
an identification information input unit for inputting identification information to identify said order contents;
an image data storing unit for storing the image data by associating with said identification information;
an order information storing unit for storing order information by associating with said identification information;
a second terminal for inputting said identification information as information to be used for authenticating said order information;
a risk ratio calculating unit for calculating a credibility relating to a purchase of the printing pictures made by the customer from information relating to the customer associated with customer identification information, calculating a risk ratio based on said credibility, and outputting said alert information when said risk ratio is above a predetermined value; and a production unit for producing the printing pictures designated in said order information after receiving said authenticated order information and the image data, wherein the production management apparatus manages a printing of pictures ordered by a customer by referring to the order information storing unit and the image data storing unit, wherein said order information storing unit comprises order expiry date information defining a term to store said order information, wherein said order information is authenticated by extending the term determined by said order expiry date information when said identification information is input, wherein said order information stored in the order information storing unit is deleted when the term expires, wherein the first terminal is connected to the production management apparatus via a network;

wherein the second terminal is connected to both the first terminal and the production management apparatus via the network, wherein said second terminal has an access right to authenticate said order information for at least one of said image data storing unit and said order information storing units, wherein said identification information is given to the customer in exchange for receiving the image data, and wherein said image data storing unit instructs said first terminal to display the image data by an input of said identification information from said first terminal.

19. The production system as claimed in claim 18, wherein said risk ratio calculating unit calculates said risk ratio at the time of producing the printing pictures, wherein said production unit starts producing the printing pictures in a condition that said alert information is lifted.

20. The production system as claimed in claim 18, further comprising a customer information storing unit for storing information relating to the customer, wherein said first terminal comprises a customer identification information input unit for inputting said customer identification information to identify said information relating to the customer.

21. The production system as claimed in claim 20, wherein said information relating to the customer comprises history information relating to a purchase history of the printing pictures of the customer, and wherein said risk ratio calculating unit calculates said credibility based on said purchase history of the customer.

22. The production system as claimed in claim 18, further comprising a rate calculating unit for calculating a purchase price of the printing pictures based on said order information, wherein said risk ratio calculating unit calculates said risk ratio based on said purchase price.

23. The production system as claimed in claim 18, wherein said first terminal is placed at a remote place that is at a distant location from said order information storing unit and is connected to said order information storing unit through a communication network.

24. The production system as claimed in claim 18, wherein said first terminal is connected to said order information storing unit through the Internet.

25. The production system as claimed in claim 18, wherein said second terminal displays the contents of said order information.

26. The production system as claimed in claim 18, wherein said image data storing unit sends the image data and comprises a means for instructing said first terminal to display said sent image data.

27. The production system as claimed in claim 18, wherein said identification information is provided by a bar code and a password associated with said bar code.

28. The production system as claimed in claim 18, wherein said identification information input unit issues said order information when the image data is input by said image data input unit.

29. The production system as claimed in claim 18, wherein said order information input unit comprises a means for inputting a priority condition relating to a production of the printing pictures as said order information, and wherein said production unit defines a priority order for producing the printing pictures during production of a plurality of the printing pictures based on said priority condition included in said order information and produces the printing pictures based on said priority order.

30. The production system as claimed in claim 18, wherein said production unit temporarily stops producing the printing pictures designated in said order information according to said alert information.

31. The production system as claimed in claim 30, wherein said production unit resumes producing the printing pictures designated in said order information after said second terminal inputs said authenticated order information.

32. A production system for producing printing pictures ordered by a customer, wherein the printing pictures comprises an output image for outputting image data received from the customer to another medium, the printing pictures production system comprising:

a first terminal comprising:
  an image data input unit for inputting the image data;
  an order information input unit for inputting order information to designate order contents of the printing pictures; and
  an identification information input unit for inputting identification information to identify said order contents;

an image data storing unit for storing the image data by associating with said identification information;

an order information storing unit for storing order information by associating with said identification information;

a second terminal for inputting said identification information as information to be used for authenticating said order information;

a risk ratio calculating unit for calculating a credibility relating to a purchase of the printing pictures made by the customer from information relating to the customer associated with customer identification information, calculating a risk ratio based on said credibility, and outputting said alert information when said risk ratio is above a predetermined value;

a production unit for producing the printing pictures designated in said order information after receiving said authenticated order information and the image data; and a production management apparatus for managing a printing of print pictures ordered by a customer by referring to the order information storing unit and the image data storing unit, wherein said image data storing unit comprises image expiry date information defining a term to store the image data, wherein said order information is authenticated by extending the term determined by said image expiry date information when said identification information is input, wherein said image data stored in the image data storing unit is deleted when the term expires, wherein the first terminal is connected to the production management apparatus via a network, wherein the second terminal is connected to both the first terminal and the production management apparatus via the network, wherein said second terminal has an access right to authenticate said order information for at least one of said image data storing unit and said order information storing unit, wherein said identification information is given to the customer in exchange for receiving the image data, and wherein said image data storing unit instructs said first terminal to display the image data by an input of said identification information from said first terminal.

33. A production system for producing printing pictures ordered by a customer, wherein the printing pictures comprises an output image for outputting image data receive from the customer to another medium, the printing pictures production system comprising:

a first terminal comprising:
  an image data input unit for inputting the image data;
  an order information input unit for inputting order information to designate order contents of the printing pictures; and
  an identification information input unit for inputting identification information to identify said order contents;

an image data storing unit for storing the image data by associating with said identification information;

an order information storing unit for storing order information by associating with said identification information;

a second terminal for inputting said identification information as information to be used for authenticating said order information;

a risk ratio calculating unit for calculating a credibility relating to a purchase of the printing pictures made by the customer from information relating to the customer associated with customer identification information, calculating a risk ratio based on said credibility, and outputting said alert information when said risk ratio is above a predetermined value;

a production unit for producing the printing pictures designated in said order information after receiving said authenticated order information and the image data;

a rate calculating unit for calculating a purchase price of the product based on said order information, wherein said risk ratio calculating unit calculates said risk ratio based on said purchase price; and a production management apparatus for managing a printing of print pictures ordered by a customer by referring to the order information storing unit and the image data storing unit, wherein said image data stored in the image data storing unit is deleted when a term to store said image data is expired, wherein the first terminal is connected to the production management apparatus via a network, wherein the second terminal is connected to both the first terminal and the production management apparatus via the network, wherein said second terminal has an access right to authenticate said order information for at least one of said image data storing unit and said order information storing unit, wherein said identification information is given to the customer in exchange for receiving the image data, and wherein said image data storing unit instructs said first terminal to display the image data by an input of said identification information from said first terminal.

* * * * *